(12) United States Patent  
Graham et al.

(10) Patent No.: US 8,289,367 B2
(45) Date of Patent: Oct. 16, 2012

(54) CONFERENCING AND STAGE DISPLAY OF DISTRIBUTED CONFERENCE PARTICIPANTS

(75) Inventors: Philip R. Graham, Milpitas, CA (US); Michael H. Paget, Tracy, CA (US)

(73) Assignee: Cisco Technology, Inc., San Jose, CA (US)

( * ) Notice: Subject to any disclaimer, the term of this patent is extended or adjusted under 35 U.S.C. 154(b) by 1248 days.

(21) Appl. No.: 12/049,998

(22) Filed: Mar. 17, 2008

(65) Prior Publication Data

US 2009/0231414 A1    Sep. 17, 2009

(51) Int. Cl.
*H04N 7/14* (2006.01)
*H04N 5/222* (2006.01)
*G09G 5/00* (2006.01)

(52) U.S. Cl. ............. 348/14.09; 348/722; 345/632

(58) Field of Classification Search ....... 348/14.09–14.1, 348/722; 345/632, 633, 419, 420; 709/204–207
See application file for complete search history.

(56) References Cited

U.S. PATENT DOCUMENTS

| | | | |
|---|---|---|---|
| 5,210,604 A | 5/1993 | Carpenter | 358/93 |
| 5,367,614 A | 11/1994 | Bisey | 395/119 |
| 5,500,671 A * | 3/1996 | Andersson et al. | 348/14.1 |
| 5,674,003 A * | 10/1997 | Andersen et al. | 709/228 |
| 5,790,124 A | 8/1998 | Fischer et al. | 345/435 |
| 6,335,765 B1 | 1/2002 | Daly et al. | 348/586 |
| 7,058,649 B2 | 6/2006 | Ough et al. | 707/102 |
| 7,716,283 B2 * | 5/2010 | Thukral | 709/204 |
| 2007/0273751 A1 * | 11/2007 | Sachau | 348/14.02 |
| 2008/0115181 A1 * | 5/2008 | Ryckman et al. | 725/109 |
| 2009/0174764 A1 * | 7/2009 | Chadha et al. | 348/14.09 |
| 2009/0207234 A1 * | 8/2009 | Chen et al. | 348/14.09 |

FOREIGN PATENT DOCUMENTS

| | | |
|---|---|---|
| BR | PI 0418701-6 A | 9/2007 |
| KR | 20020062055 | 7/2002 |
| KR | 20070007874 | 1/2007 |
| WO | WO 2007/052005 A1 | 5/2007 |
| WO | WO 2007/072014 A2 | 6/2007 |

OTHER PUBLICATIONS

"Pink is the new Blog", pp. 1-2 and Figure on p. 2, http://trent.blogspot.com/2006/10/transporter_25.html.*
Video of *TelePresence: John Chambers announces the Cisco I-Prize* available at http://www.youtube.com/watch?v=RBbPqU9DB1s, Oct. 30, 2007.

* cited by examiner

*Primary Examiner* — Wesley Kim
(74) *Attorney, Agent, or Firm* — Baker Botts L.L.P.

(57) ABSTRACT

A system comprises a stage area and an audience area with a line of sight view of the stage area. The system also includes a first display that reproduces a first video feed of a first perspective of a remote talent. The first video feed may appear, from the perspective of the audience area, to be within a first region of the stage area. The system further includes a first camera directed at the audience area and aligned so that its field of view corresponds to a line of sight from the first region to the audience area. The system additionally includes a second display viewable from a second region of the stage area and hidden from view of the audience area. The second display reproduces a second video feed of a second perspective, different that the first perspective, of the remote talent. The system also includes a second camera directed at the second region of the stage area and aligned so that its field of view corresponds to a line of sight from the second display to the second region.

21 Claims, 6 Drawing Sheets

CONFERENCING AND STAGE DISPLAY OF DISTRIBUTED CONFERENCE PARTICIPANTS

TECHNICAL FIELD

This disclosure relates generally to conferencing and stage display of distributed conference participants.

BACKGROUND

Pepper's Ghost is an illusion used to create an image of an object that appears to be part of a real-life scene or environment. This technique has been used in haunted houses to make ghosts appear and move about a room. This illusion has also been used by stage performers to add special effects, such as to cause an object or person to appear to morph into something different.

BRIEF DESCRIPTION OF THE DRAWINGS

For a more complete understanding of particular embodiments and their features and advantages, reference is now made to the following description, taken in conjunction with the accompanying drawings, in which:

FIG. 6 is a detailed block diagram of the components of a conference manager, in accordance with some embodiments.

DESCRIPTION OF EXAMPLE EMBODIMENTS

Overview

In accordance with particular embodiments, a system comprises a stage area and an audience area. The audience area has a line of sight view of the stage area. The system also includes a first display apparatus operable to reproduce a first video feed of a first perspective of at least one remote talent in a remote location. The first video feed of the remote talent may appear, from the perspective of the audience area, to be within a first region of the stage area. The system further includes a first camera directed at the audience area. The first camera is aligned so that a first field of view of the first camera corresponds to a line of sight from the first region to the audience area. The system additionally includes a second display apparatus viewable from a second region of the stage area and hidden from view of the audience area. The second display apparatus is operable to reproduce a second video feed of a second perspective of the at least one remote talent in the remote location. The second perspective is different than the first perspective. The system also includes a second camera directed at the second region of the stage area. The second camera is aligned so that a second field of view of the second camera corresponds to a line of sight from the second display apparatus to the second region.

DESCRIPTION

Particular embodiments and their advantages are best understood by referring to FIGS. 1 through 7 of the drawings, like numerals being used for like and corresponding parts of the various drawings. Certain embodiments may provide one or more technical advantages. A technical advantage of particular embodiments may be to provide an on-stage conferencing system that may allow a local talent to interact in real-time with a remote talent in a natural and realistic manner. This may be achieved because, from the audience's perspective, it appears that the remote talent is on the stage interacting with the local talent. This interaction is enhanced by the various components which facilitate in providing eye contact/gaze between the remote talent, stage talent and an audience.

Certain embodiments may include none, some, or all of the above technical advantages. One or more other technical advantages may be readily apparent to one skilled in the art from the figures, descriptions, and claims included herein.

Figure 1:
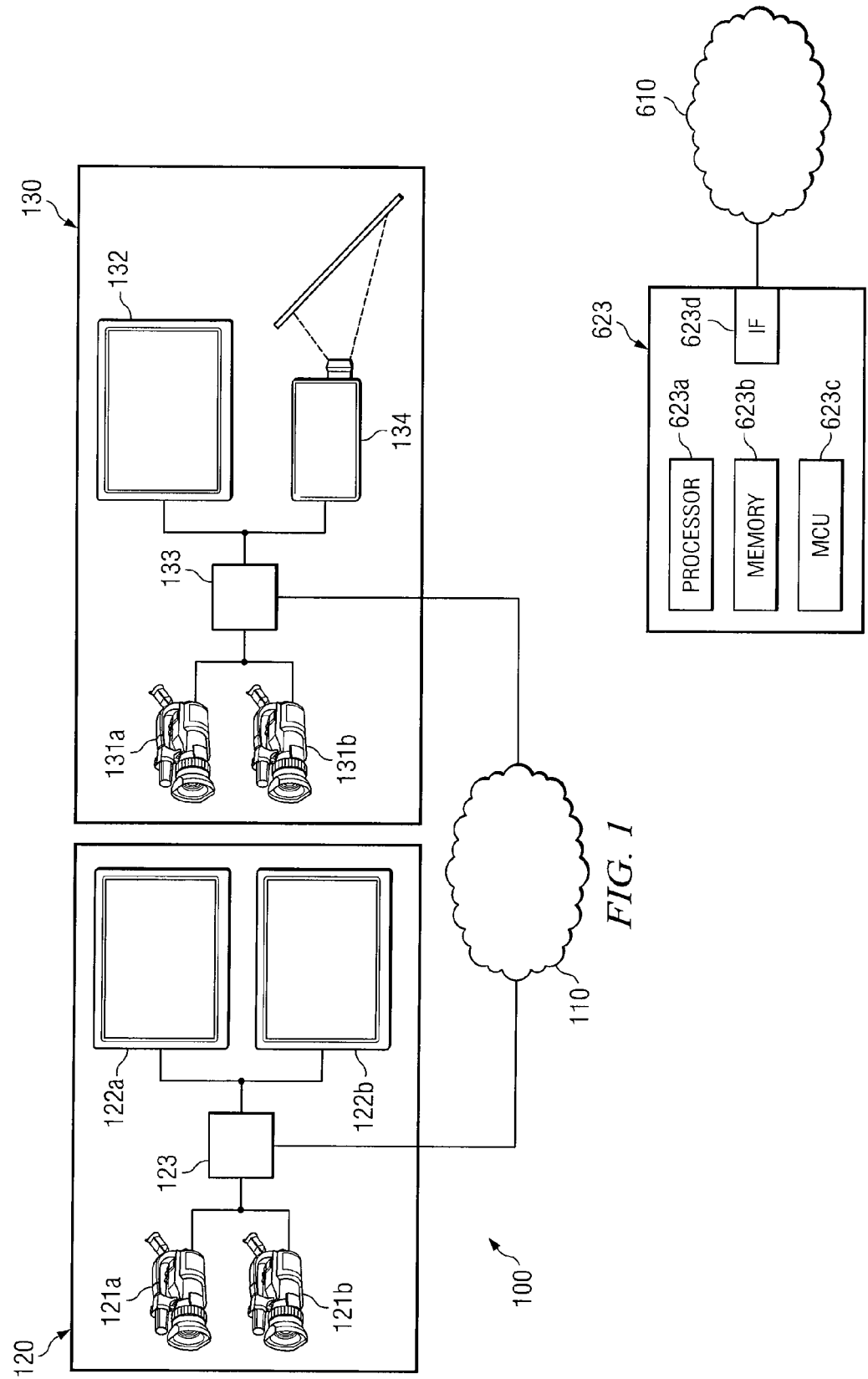
FIG. 1 is a block diagram illustrating a system for enabling on-stage conferencing between sites, in accordance with some embodiments.

FIG. 1 is a block diagram illustrating a system for enabling on-stage conferencing between sites. As illustrated, system 100 includes studio site 120 and stage site 130 coupled together by network 110. Studio site 120 may be remote from stage site 130. Depending on the scenario, remote site 120 may be as close to stage site 130 as separate rooms within the same building or as far apart as different continents.

Network 110 represents communication equipment, including hardware, software and any appropriate controlling logic, for interconnecting elements coupled to network 110 and facilitating communication between sites 100. Network 110 may include any combination of a local area network (LAN), a metropolitan area network (MAN), a wide area network (WAN), any other public or private network, a local, regional, or global communication network, an enterprise intranet, or any other suitable wireline or wireless communication links. Network 110 may include any combination of gateways, routers, hubs, switches, access points, base stations, and any other hardware, software, or a combination of the preceding that may implement any suitable protocol for communication.

The equipment depicted within studio site 120 and stage site 130 facilitates in allowing on-stage conferencing among stage and studio participants. In certain applications a participant on stage may be referred to as the on-stage talent or the local/remote talent (depending on perspective) while other participants, such as those at a studio may be referred to as studio talent or the remote/local talent (depending on perspective). In some embodiments an audience viewing the stage may also act as a participant (e.g., where audience members are allowed to ask questions). The equipment may include any suitable elements to establish and facilitate the on-stage conference. Depicted within studio site 120 are cameras 121, monitors 122, and conference manager 123. Depicted within stage site 120 are cameras 131, monitor 132, conference manager 133, and projector 134. This equipment may be utilized to provide a stage talent with an image of a studio talent with which the stage talent may interact (and vice-versa) while also providing an audience with an image of the stage talent that appears to be on stage with the stage talent. In addition to the equipment depicted in FIG. 1, stage site 130 and studio site 120 may also include additional equipment (e.g., speakers and microphones) used in facilitating the on-stage conference.

Cameras 121 and 131 may include any suitable hardware, software, and/or encoded logic used to facilitate capturing images from one site to be displayed at the other site. Cameras 121 and 131 may capture and transmit the images or video images as video streams. In some embodiments cameras 121 and/or 131 may include cameras that are able to capture and produce high-definition video streams. In particular embodiments, cameras 121 and/or 131 may comprise cameras that are able to capture an appropriate type of video stream based on the type of display apparatus that will be used to reproduce the video stream (e.g., camera 131 may capture a video stream for use with a holographic projection system).

Monitors 122 and 132 may include any suitable hardware, software and/or encoded logic used to facilitate receiving and displaying the images from cameras 121 and 131. For example, monitors 122 and 132 may include flat panel monitors. Monitors 122 and 132 may use any suitable technology that provides a realistic image, such as high definition, high-power compression hardware, and efficient encoding/decoding standards. Studio site 120 and/or stage site 130 may include additional monitors for use in providing participants with additional information (e.g., a teleprompter).

Conference managers 123 and 133 may include any suitable hardware, software, and/or encoded logic used to establish, receive, control and/or process media streams and/or signals between studio site 120 and stage site 130. Conference managers 123 and 133 may be used in establishing the on-stage conference session using any suitable technology and/or protocol, such as Session Initiation Protocol (SIP) or H.323. Conference managers 123 and 133 may also support and be interoperable with other video systems supporting other standards, such as H.261, H.263, and/or H.264. In addition, conference managers 123 and 133 may facilitate routing the various audio and video streams to their appropriate reproduction device. Conference managers 123 and 133 may also encode/decode the streams so that they may be more efficiently transmitted between one another. In some embodiments, the encoding/decoding may be done by a separate device or it may be done by the device(s) used to capture/reproduce the audio and video signals. In addition, while both studio site 120 and stage site 130 include their own conference manager 123 and 133, respectively, in particular embodiments an on-stage conference may be conducted with only one of conference managers 121 or 131.

Projector 134 may comprise any suitable hardware, software, and/or encoded logic used to create an image that appears, from an audience's perspective, to be on a stage. For example, in some embodiments, projector 134 may comprise the components needed to create a Pepper's Ghost image, a holographic image, or any other three-dimensional image or illusion. More specifically, projector 134 may receive a video stream of a studio talent from one of cameras 121. Projector 134 may then display that video stream so that it appears that the studio talent is on stage with a stage talent.

Modifications, additions, or omissions may be made to system 100. For example, system 100 may include any suitable number of sites and may facilitate an on-stage conference with any suitable number of sites. As another example, studio site 120 and/or stage site 130 may include any suitable number of cameras and/or monitors to facilitate an on-stage conference. Moreover, the operations of system 100 may be performed by more, fewer, or other components. Additionally, operations of system 100 may be performed using any suitable logic.

Figure 2:
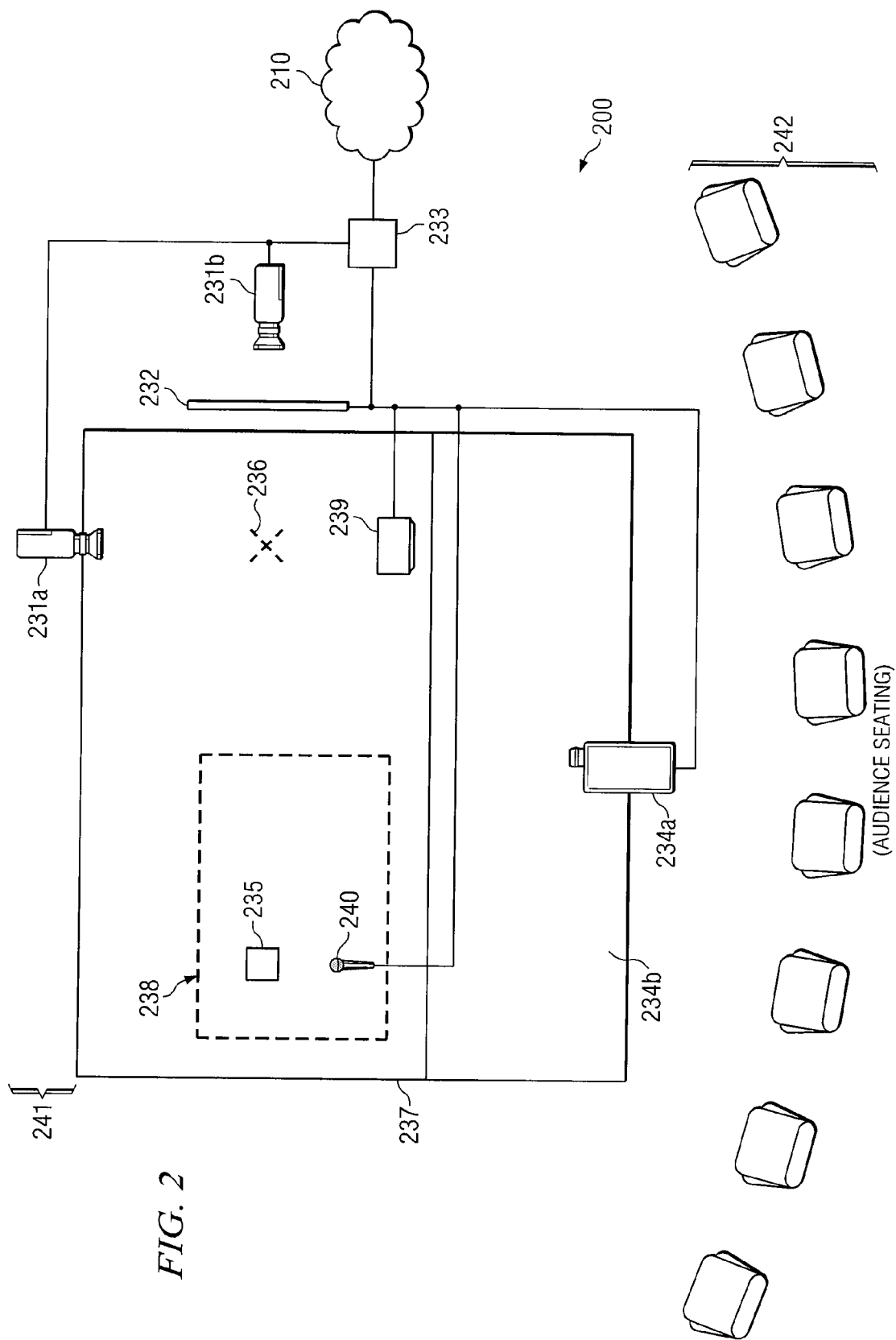
FIG. 2 is an overhead view of a theatre used by a stage talent to interact with a studio talent, in accordance with some embodiments.
Figure 3:
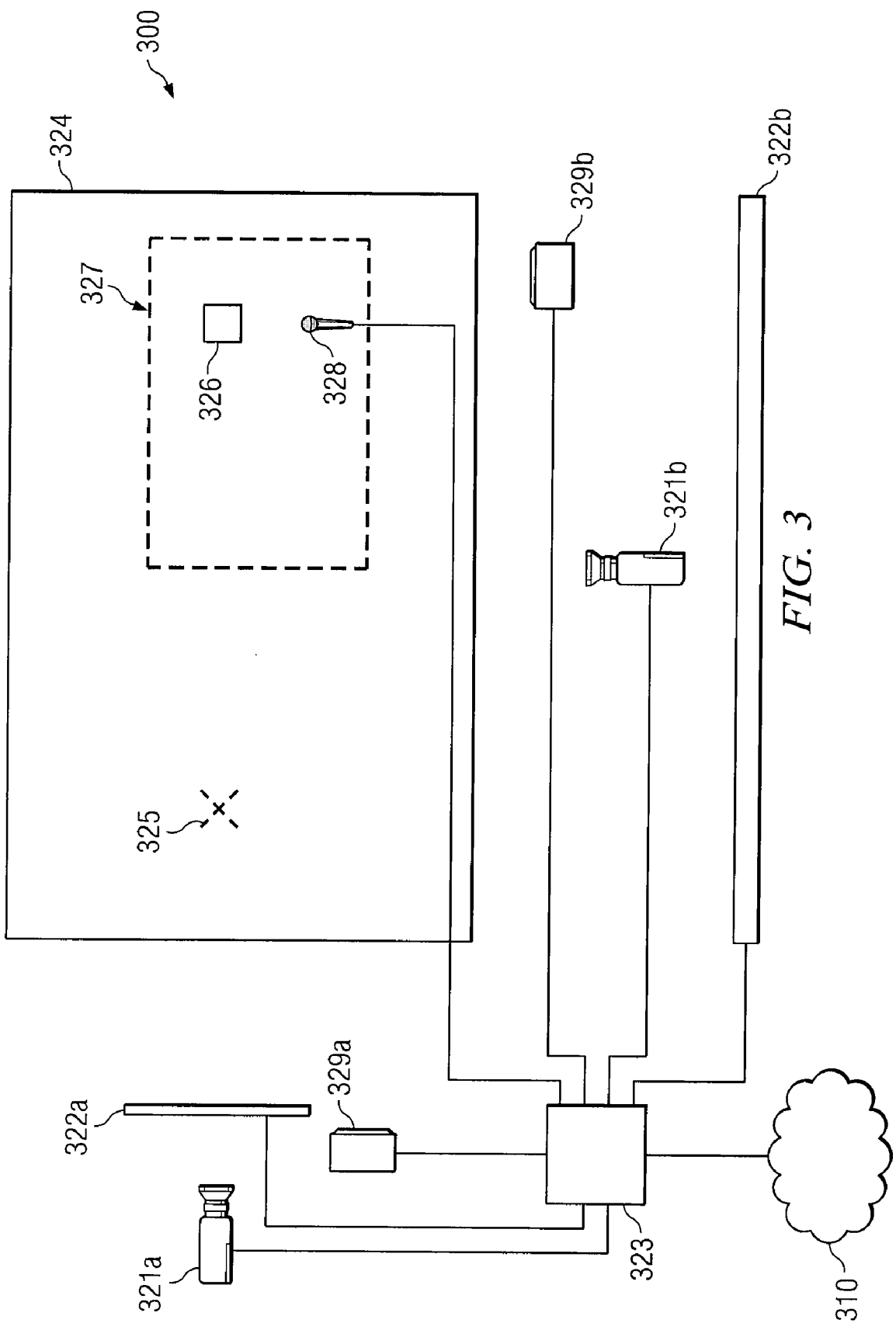
FIG. 3 is an overhead view of a studio used by a studio talent who is to be displayed at a remote stage, in accordance with some embodiments.

FIG. 2 is an overhead view of a theatre used by a stage talent to interact with a studio talent. The components of theatre 200 allow for the local stage talent 235 to interact with a remote studio talent in a natural and real-time manner. The "X" identified as number 236 represents where on stage 237 the studio talent is perceived to be by the audience. For purposes of simplicity, reference to studio image 236 indicates the image perceived by the audience to be at the "X" while reference to the studio talent indicates the actual studio talent on which studio image 236 is based. From the perspective of audience 242 it appears as though the studio talent is on stage 237 and interacting with stage talent 235. However, the studio talent is not physically on stage 237. Rather the studio talent is performing within studio 300 as shown in FIG. 3. The studio talent and stage talent 235 may often be people but the term talent (and participant) should not be limited to only people or even to living things. For example, talent may include animals (e.g., a trained dog) interactive machines (e.g., a robot), or any suitable collection of animate and inanimate objects.

It may be said that studio image 236's appearance, from audience 242's perspective, is an illusion. In order for this illusion to be successful it may be desirable for studio image 236 to appear to interact with both stage talent 235 and audience 242 in a natural and real-time manner. Similarly, stage talent 235 and audience 242 may need to be able to interact with studio image 236. Cameras 231, monitor 232, conference manager 233 and projection system 234 may facilitate in providing and enhancing the interactive illusion by allowing the participants to maintain eye contact and/or eye gaze.

In particular embodiments, projector system 234 may comprise projector 234a and optical combiner 234b. These display apparatus components may be used to create an optical illusion commonly referred to as Pepper's Ghost. The use of projector 234a and optical combiner 234b to create a Pepper's Ghost illusion is discussed in more detail below with respect to FIG. 5. In some embodiments projector system 234 may comprise different components needed to implement a different type of illusion (e.g., holography). Regardless of the technique used, projector system 234 may generate an image that allows audience 242 to see studio image 236 on stage 237. While it may appear to audience 242 that studio image 236 is on stage 237, if stage talent 235 were to look at the "X" indicating where audience 242 sees studio image 236, stage talent 235 may not see studio image 236 depending on the technique used to create studio image 236. This can make it very difficult for stage talent 235 to interact with the studio talent.

Monitor 232 may be a large display apparatus, such as a plasma, LCD, or rear projection TV/monitor. In particular embodiments monitor 232 may be at least sixty-five inches (measured diagonally). Monitor 232 may be able to display an image of the studio talent. The image displayed on monitor 232 may be generated by a camera (e.g., camera 321a of FIG. 3) located at the studio. The camera may be positioned so as to capture and transmit an image of the studio talent from the perspective of the stage talent. More specifically, the camera may be positioned and aligned so that its field of view corresponds to stage talent 235's line of sight (were stage talent 235 to be at the studio and looking at the studio talent). Monitor 232 may be aligned so that when stage talent 235 looks at monitor 232, stage talent 235's line of sight corresponds to what stage talent 235's line of site would be if the studio talent was on stage 237 as perceived by the audience. This may allow stage talent 235 to look at and interact with the video image of the studio talent displayed on monitor 232 while creating the perception that stage talent 235 is looking at and interacting with studio image 236.

Cameras 231 may be positioned and aligned so as to correspond to the line of sight of studio image 236 if the studio talent was actually on stage 237. More specifically, camera 231a may be positioned and aligned so that the center of its field of view corresponds to the line of sight of studio image 236 if studio image 236 were to look out into audience 242. Camera 231b may be positioned and aligned so that the center of its field of view corresponds to the line of sight of studio image 236 if studio image 236 were to look at stage talent 235. As may be apparent, the correspondence between the center of a camera's field of view and the line of sight of studio image 236 may not always be exact. For example, as the studio talent moves his line of sight moves. Accordingly, in positioning and aligning cameras 231 it may be desirable to determine an acceptable range within which the line of sight of studio image 236 and the center of camera 231's field of vision correspond. Similarly, an acceptable range may be determined for all the cameras located at both the stage site and the studio. The images captured from cameras 231 may be transmitted to the remote studio to provide the studio talent with a proper reference with which the studio talent may interact. Both cameras 231 may be hidden in backstage area 241 so that they are not easily discernable from audience 242. In particular embodiments camera 231a may be positioned near the front of stage 237 in rafters or any other suitable place.

In particular embodiments, cameras 231 and monitor 232 may have a fixed position. Thus, in order to maintain the illusion that stage talent 235 is looking at studio image 236, stage talent 235 may have a limited area within which stage talent 235 may be allowed to move. In FIG. 2 this area is shown as boundary area 238. In particular embodiments, boundary area 238 may be based on the width of monitor 232 and/or the field of view of camera 231b. As discussed above, this may help maintain the acceptable range for which the line of sight of studio image 236 and the center of camera 231b's field of vision correspond.

Besides visual interaction, particular embodiments may also allow for audible interaction. Accordingly, microphone 240 may be able to detect sounds emanating from, or in proximity to, stage talent 235. These sounds may be transmitted as an audio signal to the studio hosting the studio talent. Microphone 240 may be the same microphone that is used to provide the audio signal for any speakers used to broadcast sound to audience 242 (e.g., the house speakers). In addition, particular embodiments may include one or more microphones (not depicted) situated so as to detect sounds emanating from audience 242. This may, for example, allow the studio talent to field questions from audience 242 or react to the audience's actions or responses.

Speaker 239 may be able to reproduce sounds originating in the remote studio. In some embodiments speaker 239 may be positioned so that when it reproduces sound it sounds like it is emanating from studio image 236. In some embodiments, speakers 239 may include the house speakers (e.g., the speakers arranged throughout the audience area of a stage or theatre).

Conference manager 233 may include any hardware, software and/or encoded logic used to send, receive, combine, synchronize, encode, decode, distribute and/or format any audio, video, or data signals being sent to, and received from, the remote studio. For example, conference manager 233 may synchronize the audio and video signals and distribute them to their proper destinations. As another example, conference manager may compress the audio and video signals to allow for more efficient transmission through network 210 (network 210 may be similar to network 110 of FIG. 1).

FIG. 3 is an overhead view of a studio used by a studio talent who is to be displayed at a remote stage. The components of studio 200 allow for the local studio talent 326 to interact with a remote stage talent 325 in a natural and real-time manner. This interaction may be presented to an audience such that when they viewing the stage they perceive it to be an interaction between two or more participants that are all currently on the stage. This may be accomplished despite the fact that studio talent 326 is not actually on the stage with the stage talent. As studio talent 326 performs, cameras 321a and 321b and microphone 328 may generate video and audio feeds (or signals), respectively, representing studio talent 326's performance. These signals may then be reproduced by the various monitors, projector systems and speakers arranged around the remote stage to create the interactive illusion.

In order for studio talent 326 to be able to interact in a realistic manner it may be desirable for studio talent 326 to be able to see and hear the stage talent and the audience. Accordingly, monitor 322b may be used to display the remote audience, speaker 329b may be used to reproduce sound from the audience, monitor 322a may be used to display the stage talent, and speaker 329a may be used to reproduce sound from the stage talent. It may also be desirable for the audience and stage talent to be able to hear and see studio talent 326. Accordingly, cameras 321 may be used to generate a video signal comprising studio talent 326 and microphone 328 may be used to generate an audio signal comprising sound from studio talent 326.

While cameras 321 may both be used to generate video signals comprising studio talent 326, cameras 321a and 321b capture different perspectives of studio talent 326. More specifically, camera 321a may generate the video signal displayed on an offstage monitor that the stage talent is able to view and interact with; this video signal is from the perspective of the stage talent. Camera 321b may generate the video signal presented to the audience, such that studio talent 326 appears to be onstage with the stage talent; this video signal is from the perspective of the audience.

Microphone 328 may be used to capture sounds from studio talent 326. The captured sounds may be used to generate an audio signal that may be reproduced by various speakers located at the stage where the audio and video signals are being reproduced. The audio signal generated by microphone 328 may be synchronized with video signals generated by cameras 321. The synchronization may be done by conference manager 323 and/or a remote conference manager at the stage.

As may be apparent, studio talent 326 would not be able see or hear the stage talent or the remote audience without the assistance of monitors 222 and/or speakers 229. Monitor 322a may display the stage talent and speaker 329a may reproduce an audio signal comprising sound emanating from the vicinity of the stage talent. Monitor 322b may display a video image of the audience and speaker 329b may be able to reproduce sounds emanating from the audience. Speakers 329a and 329b may be positioned such that studio talent 326 may be able to recognize whether sound is coming from speaker 329a (and thus the stage talent) or speaker 329b (and thus the audience). By positioning speakers 329 in this fashion, studio talent 326's reaction to questions or comments from the stage talent or the audience may appear natural.

This natural reaction/interaction is further enhanced by the placement of cameras 321 and monitors 322. Camera 321a and monitor 322a may be positioned so that when studio talent 326 looks at the stage talent displayed on monitor 322*a*, camera 321*a* is able to capture a video image of studio talent 326 that appears as though studio talent 326 is maintaining eye contact with the stage talent. Monitor 322*b* and camera 321*b* may be arranged so that when studio talent 326 looks at the audience displayed on monitor 322*b*, camera 321*b* may be able to generate a video signal in which it appears that studio talent 326 is looking at the audience. As discussed above, cameras 321 may be able to generate an appropriate type of video stream based on the monitor 322 to which it is to be reproduced (e.g., high-definition or holographic).

Conference manager 323 may be similar to, and perform similar functions as, any of conference managers 123, 133, or 223 as indicated above.

Figure 4:
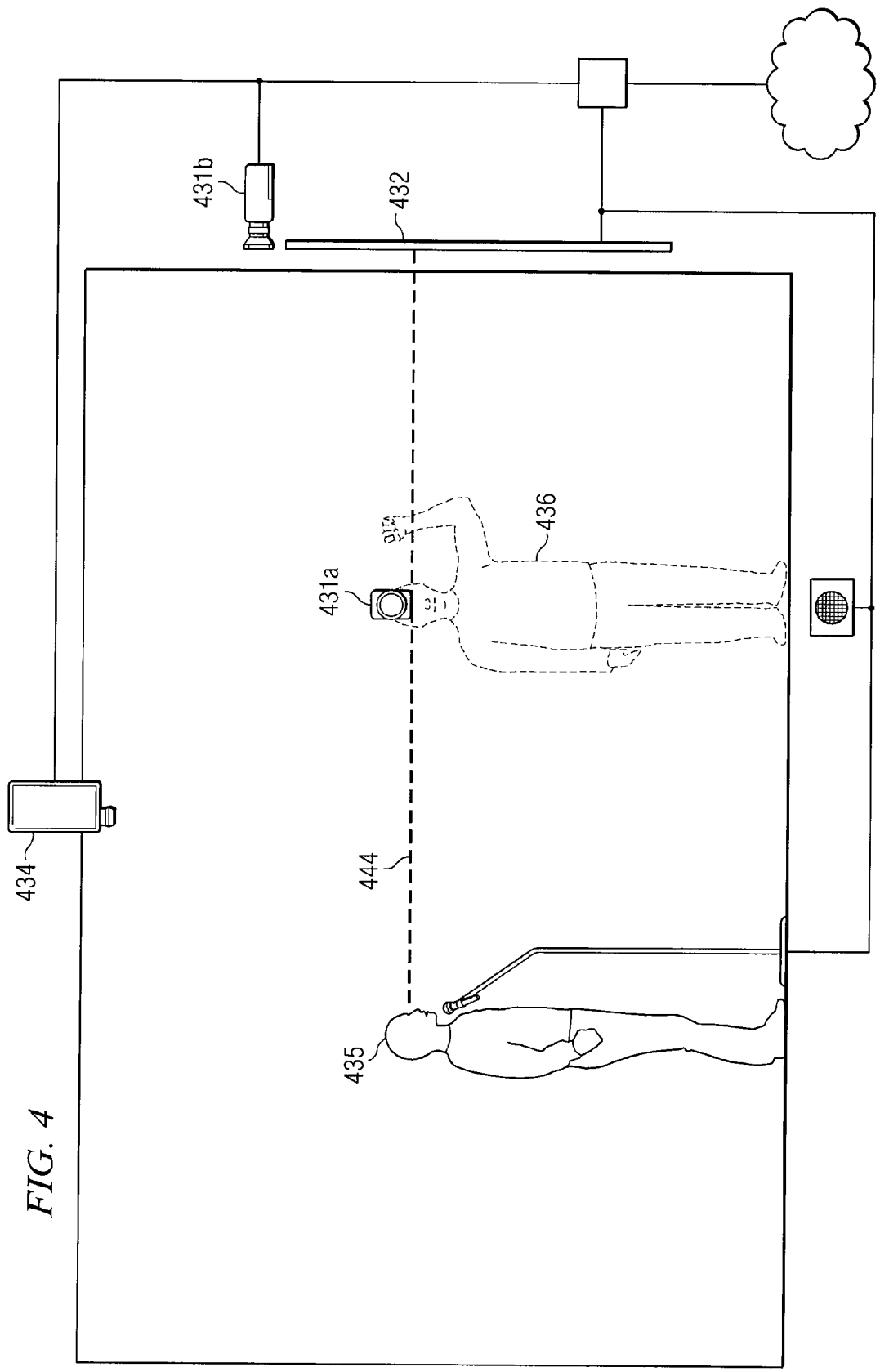
FIG. 4 is a front view of the stage depicted in FIG. 2, in accordance with some embodiments.

FIG. 4 is a front view of the stage depicted in FIG. 2. From this view it may be seen how the various components of an on-stage conferencing system may be arranged to facilitate in providing a realistic illusion in which stage talent 435 appears to be interacting with a studio talent (represented as studio talent image 436) within the stage area.

Projector 434 (along with an optical combiner not depicted in FIG. 4) may be used to create studio talent image 436 which appears, from the audience's perspective, to be within the stage area interacting with stage talent 435. As before, monitor 432 displays an image of the studio talent. Monitor 432 is positioned such that when stage talent 435 looks at the studio talent displayed on monitor 432 his line of sight 444 corresponds with the eyes of studio talent image 436. Thus, from the perspective of the audience it appears that stage talent 435 is looking at studio talent image 436 when in fact stage talent 435 is looking at monitor 432. This may be particularly desirable in embodiments in which stage talent 435 is not able to see studio talent image 436.

Camera 431*b* may be positioned so that it is able to generate an image of stage talent 435 that properly captures the eye contact and eye gaze of stage talent 435. More specifically, camera 431*b* may be arranged so that the center of its field of view corresponds (as discussed above, this correspondence need not be an exact match) to the line of sight of the image of the studio talent as displayed on monitor 432. Thus, as stage talent 435 looks at monitor 432, camera 431*b* may be able to generate a video signal that, when reproduced at the studio, captures stage talent 435 looking at studio talent.

Camera 431*a* may be aligned so that the center of its field of view corresponds (as discussed above, this correspondence need not be an exact match) to the line of sight of studio talent image 436. Accordingly, the video signal generated by camera 431*a* may comprise much of the same imagery that the student talent would see if he were on the stage where studio talent image 436 appears to be. More specifically, by displaying the video signal generated by camera 431*a* on a properly placed monitor at the studio, the studio talent may be able to see the audience as though he were on the stage even though he is located in a remote studio.

Figure 5:
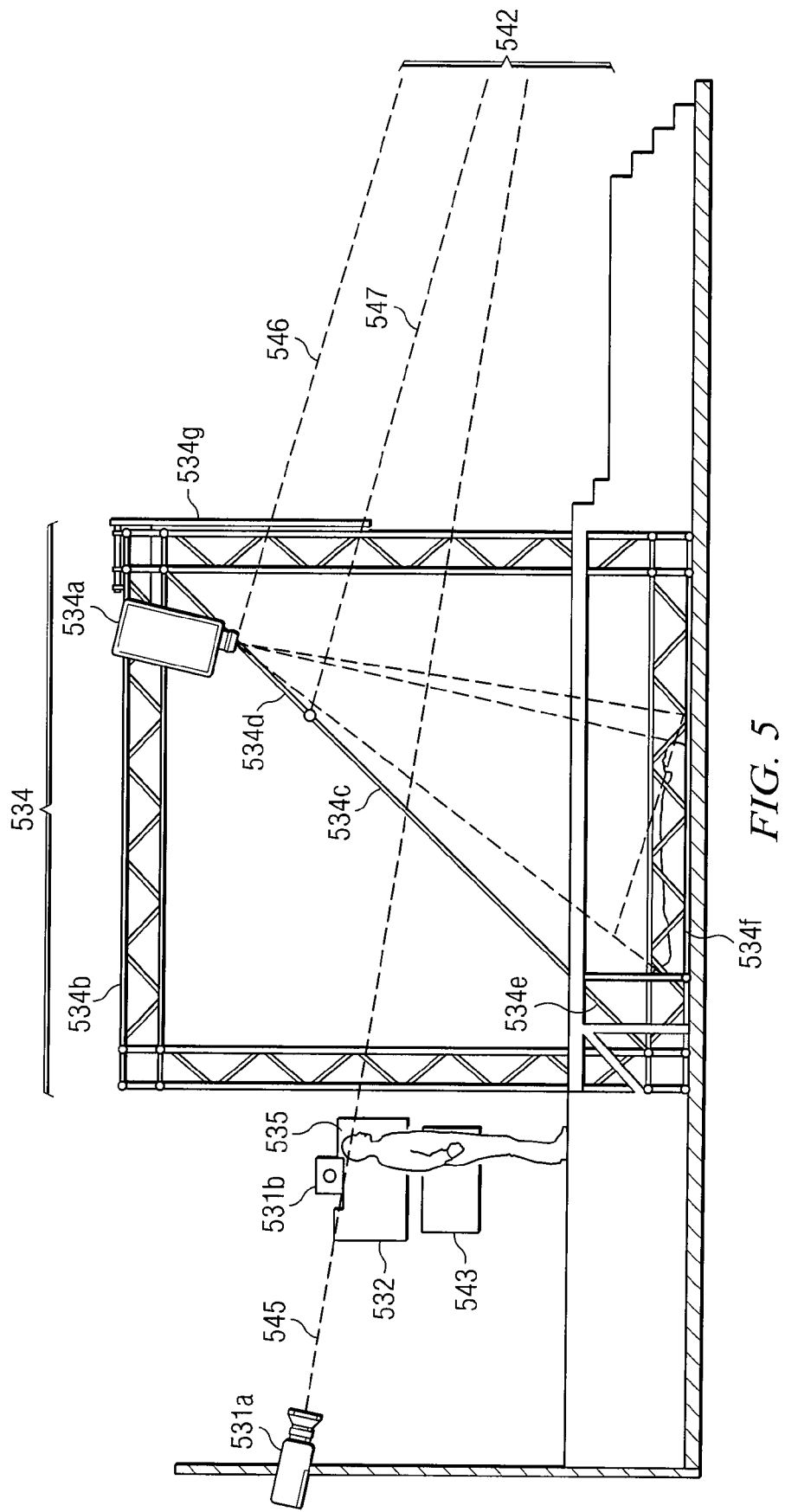
FIG. 5 is a side view of the stage depicted in FIG. 2, in accordance with some embodiments.

FIG. 5 is a side view of the stage depicted in FIG. 2. From this the components of projector system 534 may be seen in more detail. In addition to projector system 534, FIG. 5 also provides an additional perspective illustrating a possible arrangement of cameras 531 and monitors 532 and 543 that may help facilitate the real-time interaction between stage talent 535 and a remote studio talent.

As discussed above with respect to camera 431*a* of FIG. 4, camera 531*a* is arranged to correspond to the line of sight of the studio talent (as perceived from audience 542). More specifically, camera 531*a* is aligned so that the center of its field of view 545 passes through where audience 542 perceives to be the eyes of the studio talent (as discussed above, the field of view need not pass directly through the eyes of the perceived studio talent). From the perspective shown in FIG. 5 it appears that field of view 545 is passing through stage talent 535's head. However, as can be seen in FIG. 4, it actually passes to the left of stage talent 535. Camera 531*a* may further be positioned so that people in the audience may not be able to easily recognize the existence of camera 531*a*.

Camera 531*b* and monitor 532 may be arranged as described above with respect to camera 431*b* and monitor 432*b* of FIG. 4. In addition, monitor 543 may be used to provide stage talent 535 with additional information. For example, in some embodiments monitor 543 may comprise a teleprompter that provides stage talent 535 with his lines.

Projector system 534 includes projector 534*a*, support truss 534*b*, optical combiner 534*c*, upper anchor 534*d*, lower anchor 534*e*, reflective surface 534*f*, and visual shield 534*g*. These components may work together to create an illusion in which it appears that a remote studio talent is within the stage area interacting with stage talent 535.

Support truss 534*b* provides a platform to which projector 534*a*, upper anchor 534*d* and lower anchor 534*e* may be attached. As may be apparent, the length, width and depth of support truss 534*b* may vary depending on the dimensions of the stage, stage area and seating layout of audience 542. The dimensions of support truss 534*b* may also be impacted by the presentation/performance (e.g., the layout of props and talent on the stage or the effect to be created).

Based on the dimensions of the stage and the audience area, as well as where the studio talent is to appear, the positioning and alignment of projector 534*a* and optical combiner 534*c* may be determined. More specifically, projector 534*a* and optical combiner 534*c* may be aligned such that the image that is produced appears, from audience 542's perspective, to be within a particular region of the stage area. Upper anchor 534*d* and lower anchor 534*e* may be used to hold optical combiner 534*c* in place. In order to achieve this illusion the components of projector system 534 may use a technique commonly referred to as Pepper's Ghost.

In particular embodiments, optical combiner 534*c* may be made of a transparent material such as glass, plastic, Plexiglas, or other such transparent material, that is also able to reflect incident light (e.g., light from projector 534*a*). In some embodiments the optical combiner may be a thin (e.g., less than 100 micron thick) foil that may be visibly transparent yet also able to reflect incident light. The reflective and transparent nature of optical combiner 534*c* may allow users in the audience to see the image reflected off the surface of optical combiner 534*c* while not noticing the presence of optical combiner 534*c*. Thus, optical combiner 534*c* combines the reflected image created by the incident light with the real world imagery from the stage area.

In the depicted embodiment, the light incident on optical combiner 534*c* may be reflected off of reflective surface 534*f*. In particular embodiments reflective surface 534*f* may comprise a white reflective surface. In some embodiments, projector 534*a* and reflective surface 534*f* may be replaced by a single component. For example, a flat screen monitor (e.g., a plasma monitor) may be placed where reflective surface 534*f* is shown. The flat screen monitor may then be able to generate the light incident on optical combiner 534*c*. Regardless of the type of source used to create the incident light, the light source may need to be sufficiently bright so that the image reflected off of optical combiner 534*c* appears to be real (as opposed to a projection).

The components needed to create the interactive on-stage experience may, as much as possible, be hidden from the view of audience 542. For example, as discussed above, cameras 531 and monitors 532 and 543 may be hidden off-stage or otherwise disguised. As another example, support truss 534b may include visual shield 534g which may prevent people in audience 542 from seeing projector 534a or upper anchor 534d. This can be seen by the fact that visual shield 534g extends past lines of sight 546 and 547. Lines of sight 546 and 547 represent the lines of sight from audience members towards the stage area. Visual shield 534g may comprise an opaque material that matches with the theatre décor or the theme of the stage and/or performance. In addition both lower anchor 534e and reflective surface 534f may be below the level of the stage and thus hidden from the view of an audience member.

FIG. 6 is a detailed block diagram of the components of a conference manager. More specifically, conference manager 623 includes processor 623a, memory 623b, multipoint conference unit 623c (MCU 623c) and interface 623d. Other conference managers may include different and/or additional components.

Processor 623a may include any suitable combination of hardware, software, and/or encoded logic that operate to control and process media streams and/or signals. Media streams may include audio, video and/or data. Depending on the embodiment, processor 623a may be a programmable logic device, a controller, a microcontroller, a microprocessor, any suitable processing device, or any combination of the preceding. Processor 623a may be operable to provide, either alone or in conjunction with other conference manager components (e.g., memory 623b, MCU 623c, and interface 623d) on-stage conferencing functionality. Such functionality may include synchronizing audio, video and data streams. Another function may include formatting the streams for transmission through network 610. Yet another feature may comprise compressing the audio, video and/or data streams to provide for more efficient transportation of the streams. For example, processor 623a may load a particular video codec from memory 623b. Using the video codec processor 623a may be able to compress a video signal so that it requires fewer network resources to be transmitted to a remote conference manager via network 610.

Memory 623b may include any form of volatile or nonvolatile memory including, without limitation, magnetic media, optical media, random access memory (RAM), read-only memory (ROM), removable media, or any other suitable local or remote memory component. Memory 623b may store any suitable data or information, including software and encoded logic, utilized by conference manager 623. For example, memory 623b may maintain a listing, table, or other organization of information used in determining the relative arrangement of the various monitors, cameras, speakers and microphones. In some embodiments, memory 220 may store one or more policies that may be used in determining the type of encoding and/or level of compression to apply to particular audio or video streams. These policies may, for example, effect whether the quality of the audio or video takes precedence.

MCU 623c may represent or use any appropriate combination of hardware, software and/or encoded logic either within, or coupled to, conference manager 623 or distributed throughout network 610. This may allow MCU 623c may be able to route, or facilitate in the routing of, incoming and outgoing audio and video streams to the proper devices. For example, MCU 623c may route an audio stream from a studio talent to a speaker on the stage located approximately where the image of the studio talent appears, and to the theatre's house speakers that surround the audience.

Interface 623d may represent any port or connection, real or virtual, including any hardware, software, or encoded logic needed to be able to send and receive audio and video streams and/or data between other on-stage conferencing equipment components or other conference managers. For example, interface 623d may exchange messages with another conference manager to set-up an on-stage conference. The messages may contain information about the number and/or arrangement of cameras, microphones, monitors, and speakers. In particular embodiments, the messages may be sent/received via network 610.

Figure 7:
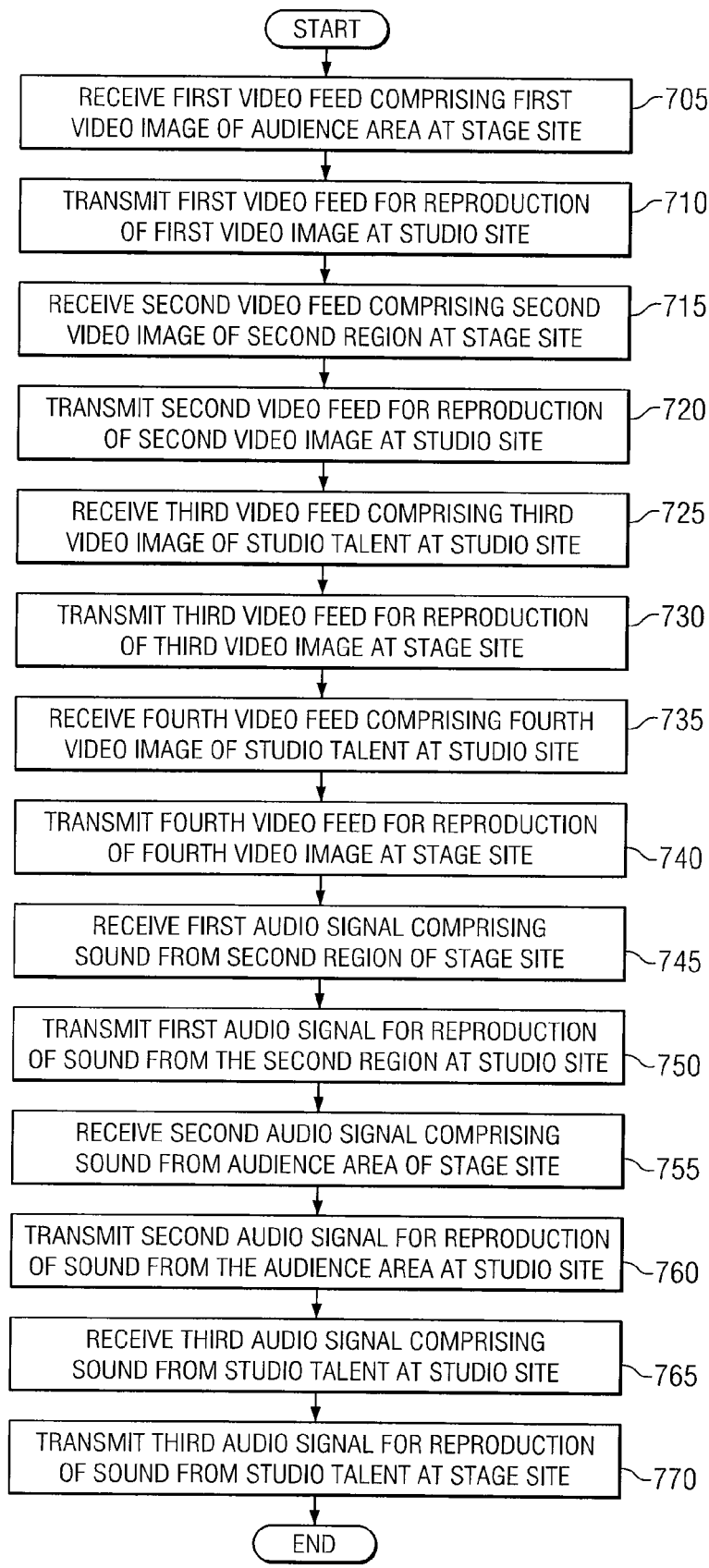
FIG. 7 is a flowchart illustrating a method for implementing on-stage conferencing, in accordance with some embodiments.

FIG. 7 is a flowchart illustrating a method for implementing on-stage conferencing. For purposes of the steps illustrated it may be assumed that only one conference manager is being used to facilitate an on-stage conference between a studio talent at a studio site and a stage talent and audience at a stage site. Other embodiments may include additional conference managers. While the steps are shown sequentially, it may be apparent that many of the steps may be performed in parallel. More specifically, in particular embodiments video feeds and audio signals may be continuously received and transmitted between the stage site and the studio site during the duration of the on-stage conference.

The method begins at step 705 with the receipt of a first video feed comprising a first video image of an audience area at a stage site. In particular embodiments, the first video feed may be generated by a first camera located at the stage site. The first camera may be directed at the audience area and aligned so that a field of view of the first camera corresponds to a line of sight from a first region of the stage area to the audience area. In other words, the first camera may be positioned so that the resulting first video image corresponds to what a remote studio talent would see if he were actually in the first region of the stage area looking out at the audience. This first video image may then be presented to the studio talent at a remote location so that the studio talent is able to view the audience area. In some embodiments, there may be multiple cameras arranged to capture different portions of the audience area. Thus, the first video feed may comprise multiple video streams which may be reproduced by multiple monitors at the studio site.

At step 710, the first video feed is transmitted to the studio site for reproduction of the first video image. The first video feed may be reproduced by a first display apparatus. In particular embodiments, the first display apparatus may comprise one or more flat panel monitors. The first display apparatus may be arranged such that when the studio talent views the first video image on the first display apparatus he is able to see the audience area in approximately the same location/direction as if he were in the first region of the stage area looking out at the audience.

At step 715, a second video feed comprising a second video image of a second region of the stage site is received. The second region of the stage site may be the region of the stage area within which a stage talent is performing. In particular embodiments, the second region may be defined by a boundary marker indicating the limits within the stage area the stage talent may be able to move and still be able to maintain the appearance of eye contact/gaze with the studio talent. The size of the second region may be based, in part, on the equipment (e.g., cameras and monitors) used to facilitate the on-stage conference. In some embodiments, the second video feed may be generated by a second camera located off stage. From its off-stage location, the second camera may be directed at the second region of the stage area and aligned so that a field of view of the second camera corresponds to a line of sight from the first region (the region within which the audience perceives the studio talent to be performing) to the second region. Thus, the second camera may be able to capture a second video image that corresponds to what the studio talent would see if he were in the first region looking at the stage talent in the second region.

At step 720, the second video feed is transmitted for reproduction at the studio site. The second video feed may be reproduced by a second display apparatus arranged to correspond to the location of the remote stage talent. For example, if, from the first region at the stage site, the stage talent was to the right of the perceived image of the studio talent, then the second display apparatus would be to the right of the actual studio talent at the studio site. Thus, the studio talent may need to turn his head to switch his view from the audience shown on the first display apparatus to the stage talent shown on the second display apparatus. This movement may allow for a natural interaction between the studio talent and the stage talent and the audience.

At step 725, a third video feed comprising a third video image of the studio talent at the studio site is received. The third video feed may be generated by a third camera located at the studio site and directed at the studio talent. The third video feed may be used to generate the image of the studio talent that appears in the stage area. Accordingly, depending on the type and/or technology of the display apparatus used at the stage site, the third camera may comprise a corresponding technique. The third camera may be aligned so that a field of view of the third camera corresponds to a line of sight from the first display apparatus at the studio site to the studio talent. The third video image captured by the third camera may represent a perspective of the studio talent corresponding to the perspective of the studio talent as an audience member would see from the audience area of the stage site.

At step 730, the third video feed is transmitted to the stage site for reproduction of the third video image. The third video image may be reproduced using any of the techniques discussed above for reproducing a realistic 3-D image. For example, in particular embodiments, the third video image may be reproduced using a technique commonly referred to as Pepper's Ghost. From the perspective of the audience area, the third video image may appear to be within the first region of the stage area.

At step 735, a fourth video feed comprising a fourth video image of the studio talent is received at the studio site. The fourth video feed may be generated by a fourth camera directed at the studio talent. The fourth camera may be aligned so that a field of view of a fourth camera corresponds to a line of sight from the second display apparatus to the studio talent. Thus, the fourth camera may be able to capture a video image of the studio talent from the perspective of the stage talent. As may be apparent, because the fourth camera is directed from the second display apparatus and the third camera is directed from the first display apparatus, the perspective of the third and fourth cameras may be different. This may allow for different perspectives of the studio talent to be transmitted to the stage site. These different perspectives may allow the audience and the stage talent to be presented with a perspective of the studio talent that is most appropriate for them to be able to interact with the studio talent.

At step 740, the fourth video feed is transmitted to a stage site for reproduction of the fourth video image. The fourth video image may be reproduced by a fourth display apparatus. The fourth display apparatus may be located back stage so that it is hidden from view of the audience area yet still viewable from the second region of the stage area. This may allow the stage talent to interact with the fourth video image of the studio talent. The fourth display apparatus may be positioned such that when the stage talent looks at the fourth video image being reproduced by the fourth display apparatus it appears, from the audience's perspective, that the stage talent is looking at the image of the studio talent being reproduced from the third video image.

At step 745, a first audio signal comprising sound from the second region of the stage site is received. The sound of the first audio signal may include the spoken words or any other sounds or noises emanating from or around the stage talent. A first microphone may, accordingly, be positioned so that it may be able to pick-up the sounds. At step 750, the first audio signal is transmitted to the studio site for reproduction of the sound from the second region. The first audio signal may be reproduced using a first speaker. The first speaker may be located in proximity to the display apparatus used to display the stage talent. Accordingly, when the stage talent speaks and the first speaker reproduces the first audio signal, the studio talent may be able to identify that the source of the sound was the stage talent.

At step 755, a second audio signal comprising sound from the audience area of the stage site is received. The second audio signal may be generated from microphones distributed throughout the audience area. These microphones may be used to record questions or reactions from audience members located within the audience area.

At step 760, the second audio signal is transmitted to the studio site for reproduction of the sound from the audience area. As with the first audio signal, the second audio signal may be reproduced by a speaker located in proximity to the display apparatus used for displaying the audience area. Thus, for example, when an audience member speaks the studio talent may be able to recognize that the speaker is in the audience area.

At step 765, a third audio signal comprising sound from the studio talent at the studio site is received. This sound may be converted into the third audio signal by a microphone located within proximity of the studio talent. At step 770, the third audio signal is transmitted to the stage site for reproduction of the sound from the studio talent. In particular embodiments, the third audio signal may be reproduced by a plurality of speakers distributed around the audience area (these speakers may be referred to as house speakers). In some embodiments, the third audio signal may be reproduced by a speaker located in the first region to represent sound coming from the image of the studio talent that appears to be within the first region.

Modifications, additions, or omissions may be made to the method depicted in FIG. 7. The flowchart may include more, fewer, or other steps. Additionally, steps may be performed in any suitable order and by any suitable component. For example, in particular embodiments a fifth video feed may be used to present the stage talent with additional information (e.g., his lines).

Although several embodiments have been described, a myriad of changes, variations, alterations, transformations, and modifications may be suggested to one skilled in the art, and it is intended that the some embodiments encompass such changes, variations, alterations, transformations, and modifications as falling within the scope of the appended claims. For example, while the depicted embodiments only showed a single camera directed at the audience area, in embodiments with large audience areas, multiple cameras may be used. Accordingly, at the remote studio site multiple monitors may be arranged to display the full audience area as captured by the multiple cameras.

What is claimed is:

1. A system comprising: a stage area;
an audience area with a line of sight view of the stage area;
a first display apparatus operable to reproduce a first video feed of a first perspective of at least one remote talent in a remote location, the first video feed of the remote talent appearing, from the perspective of the audience area, to be within a first region of the stage area;
a first camera directed at the audience area, the first camera aligned so that a first field of view of the first camera corresponds to a line of sight from the first region to the audience area;
a second display apparatus viewable from a second region of the stage area and hidden from view of the audience area, the second display apparatus operable to reproduce a second video feed of a second perspective of the at least one remote talent in the remote location, the second perspective different than the first perspective;
a second camera directed at the second region of the stage area, the second camera aligned so that a second field of view of the second camera corresponds to a line of sight from the second display apparatus to the second region; and
a conference manager operable to:
establish a communication session with a remote conference manager at the remote location;
receive the first video feed from a first remote camera;
receive the second video feed from a second remote camera;
output the first video feed to be reproduced by the first display apparatus;
output the second video feed to be reproduced by the second display apparatus;
receive a third video feed of the audience area from the first camera;
receive a fourth video feed of the second region of the stage area from the second camera;
transmit the third video feed of the audience area to the remote conference manager; and
transmit the fourth video feed of the second region of the stage area to the remote conference manager.

2. The system of claim 1, wherein the second region of the stage area comprises a boundary marker defining a portion of the stage area corresponding to an effective field of view of the second camera and excluding the first region of the stage area.

3. The system of claim 1, wherein the second region of the stage area comprises a boundary marker defining a portion of the stage area corresponding to a width of the second display apparatus and excluding the first region of the stage area.

4. The system of claim 1, further comprising:
a first microphone operable to generate a first audio signal comprising sound from the second region;
a second microphone operable to generate a second audio signal comprising sound from the audience area; and
a first speaker operable to reproduce a third audio signal comprising sound from the at least one remote talent.

5. The system of claim 4, wherein the conference manager is further operable to:
receive the first audio signal from the first microphone;
transmit the first audio signal from the first microphone to the remote conference manager;
receive the second audio signal from the second microphone;
transmit the second audio signal from the second microphone to the remote conference manager;
receive from the remote conference manager the third audio signal to be reproduced by the first speaker; and
output the third audio signal to be reproduced by the first speaker.

6. The system of claim 1, wherein the first display apparatus comprises:
a first image source operable to reproduce the first video feed such that the first image source produces a stream of light corresponding to the first video feed; and
an optical combiner made of a transparent material operable to reflect the stream of light incident to a surface of the optical combiner.

7. The system of claim 6, further comprising a shield aligned to hide the first image source from view of the audience area.

8. The system of claim 1, further comprising a second monitor viewable from the second region and operable to display additional information.

9. A system comprising: a first display apparatus operable to reproduce a first video feed comprising a video image of a remote audience area;
a first camera directed at a local talent, the first camera aligned so that a first field of view of the first camera corresponds to a line of sight from the first video image of the remote audience area to the local talent;
a second display apparatus operable to reproduce a second video feed comprising a video image of a remote talent;
a second camera directed at the local talent, the second camera aligned so that a second field of view of the second camera corresponds to a line of sight from the second video image of the remote talent to the local talent; and
a conference manager operable to:
establish a communication session with a remote conference manager at a remote location;
receive video feed information generated by one or more cameras at the remote location;
output the first video feed to be displayed by the first display apparatus;
output the second video feed to be displayed by the second display apparatus;
receive a third video feed of the local talent from the first camera; and
receive a fourth video feed of the local talent from the second camera.

10. The system of claim 9, further comprising a movement boundary marker limiting the area of movement of the local talent.

11. The system of claim 9, further comprising:
a first microphone operable to generate a first audio signal comprising sound from the local talent;
a first speaker operable to reproduce a second audio signal comprising sound from the remote talent; and
a second speaker operable to reproduce a third audio signal comprising sound from the remote audience area.

12. The system of claim 11, wherein the conference manager is further operable to:
receive the first audio signal from the first microphone;
transmit the first audio signal to the remote conference manager;
receive the second audio signal from the remote conference manager;
output the second audio signal to be reproduced by the first speakers;
receive the third audio signal from the remote conference manager; and output the third audio signal to be reproduced by the second speaker.

13. A system comprising:
a theatre site comprising:
a stage area comprising a first region and a second region;
an audience area with a line of sight view of the stage area;
a first camera directed at the audience area and aligned so that a first field of view of the first camera corresponds to a line of sight from the first region to the audience area;
a second camera directed at the second region of the stage area and aligned so that a second field of view of the second camera corresponds to a line of sight from the first region of the stage area to the second region of the stage area;
a first display apparatus hidden from view of the audience area and operable to generate a first video image that appears, from the perspective of the audience area, to be within the first region of the stage area; and
a second display apparatus hidden from view of the audience area and operable to generate a second video image that is viewable from the second region of the stage area; and
a studio site comprising:
a third display apparatus and a fourth display apparatus;
a third camera directed at a studio talent and aligned so that a third field of view of the third camera corresponds to a line of sight from the third display apparatus to the studio talent, wherein the third display apparatus is operable to generate a third video image that is viewable by the studio talent when the studio talent is looking in a first direction; and
a fourth camera directed at the studio talent and aligned so that a fourth field of view of the fourth camera corresponds to a line of sight from a fourth display apparatus to the studio talent, wherein the fourth display apparatus is operable to generate a fourth video image that is viewable by the studio talent when the studio talent is looking in a second direction, the second direction different than the first direction.

14. The system of claim 13, further comprising at least one conference manager operable to:
receive a first video feed comprising the third video image from the first camera, the third video image of the audience area;
transmit the first video feed to the third display apparatus;
receive a second video feed comprising the fourth video image from the second camera, the fourth video image of the second region of the stage area;
transmit the second vide feed to the fourth display apparatus;
receive a third video feed comprising the first video image from the third camera, the first video image of the studio talent from a first perspective;
transmit the third video feed to the first display apparatus;
receive a fourth video feed comprising the second video image from the fourth camera, the second video image of the studio talent from a second perspective, the second perspective different than the first perspective; and
transmit the fourth video feed to the second display apparatus.

15. The system of claim 13, wherein:
the stage site further comprises:
a first microphone operable to generate a first audio signal comprising sound from the second region;
a second microphone operable to generate a second audio signal comprising sound from the audience area; and
a first speaker operable to reproduce a third audio signal comprising sound from the studio talent; and
the studio site further comprises:
third microphone operable to generate the first audio signal comprising sound from the studio talent;
a second speaker operable to reproduce the first second audio signal; and
a third speaker operable to reproduce the second audio signal.

16. The system of claim 13, wherein the first display apparatus comprises:
a first image source operable to reproduce the first video feed such that the first image source produces a stream of light corresponding to the first video feed; and
an optical combiner made of a transparent material operable to reflect the stream of light incident to a surface of the optical combiner.

17. The system of claim 13, further comprising a second monitor operable to display additional information.

18. A method comprising:
receiving a first video feed from a first camera directed at an audience area of a stage site and aligned so that a field of view of the first camera corresponds to a line of sight from a first region of a stage to the audience area, the first video feed comprising a first video image of the audience area;
transmitting the first video feed to a first display apparatus at a studio site for reproduction of the first video image, the first video image viewable by a studio talent when the studio talent looks in a first direction;
receiving a second video feed from a second camera directed at a second region of the stage area and aligned so that a field of view of the second camera corresponds to a line of sight from the first region to the second region, the second video feed comprising a second video image of the second region of the stage area;
transmitting the second video feed to a second display apparatus at a studio site for reproduction of the second video image, the second video image viewable by the studio talent when the studio talent looks in a second direction, the second direction different than the first direction;
receiving a third video feed from a third camera directed at the studio talent at the studio site and aligned so that a field of view of the third camera corresponds to a line of sight from the first display apparatus at the studio site to the studio talent, the third video feed comprising a third video image of the studio talent from a first perspective;
transmitting the third video feed to a third display apparatus at the stage site, the third display apparatus hidden from view of the audience area and operable to reproduce the third video image, the third video image appearing, from the perspective of the audience area, to be within the first region of the stage area; and
receiving a fourth video feed from a fourth camera directed at the studio talent and aligned so that a field of view of the fourth camera corresponds to a line of sight from the second display apparatus to the studio talent, the fourth video feed comprising a fourth video image of the studio talent from a second perspective, the second perspective different than the first perspective;
transmitting the fourth video feed to a fourth display apparatus at the stage site, the fourth display apparatus hidden from view of the audience area and operable to reproduce the fourth video image, the fourth video image viewable from the second region of the stage area.

19. The method of claim 18, further comprising:
receiving from a first microphone at the stage site a first audio signal comprising sound from the second region;
receiving from a second microphone at the stage site a second audio signal comprising sound from the audience area;
receiving from a third microphone at the studio site a third audio signal comprising sound from the studio talent;
transmitting to a first speaker the third audio signal for reproduction of the sound from the studio talent; and
transmitting to a second speaker the first audio signal for reproduction of the sound from the second region; and
transmitting to a third speaker the second audio signal for reproduction of the sound from the audience area.

20. The system of claim 18, further comprising:
receiving a fifth video feed comprising a fifth video image of additional information; and
transmitting the fifth video feed to a fifth display apparatus for reproduction of the fifth video image.

21. A system comprising:
means for receiving a first video feed from a first camera directed at an audience area of a stage site and aligned so that a field of view of the first camera corresponds to a line of sight from a first region of a stage to the audience area, the first video feed comprising a first video image of the audience area;
means for transmitting the first video feed to a first display apparatus at a studio site for reproduction of the first video image, the first video image viewable by a studio talent when the studio talent looks in a first direction;
means for receiving a second video feed from a second camera directed at a second region of the stage area and aligned so that a field of view of the second camera corresponds to a line of sight from the first region to the second region, the second video feed comprising a second video image of the second region of the stage area;
means for transmitting the second video feed to a second display apparatus at a studio site for reproduction of the second video image, the second video image viewable by the studio talent when the studio talent looks in a second direction, the second direction different than the first direction;
means for receiving a third video feed from a third camera directed at the studio talent at the studio site and aligned so that a field of view of the third camera corresponds to a line of sight from the first display apparatus at the studio site to the studio talent, the third video feed comprising a third video image of the studio talent from a first perspective;
means for transmitting the third video feed to a third display apparatus at the stage site, the third display apparatus hidden from view of the audience area and operable to reproduce the third video image, the third video image appearing, from the perspective of the audience area, to be within the first region of the stage area; and
means for receiving a fourth video feed from a fourth camera directed at the studio talent and aligned so that a field of view of the fourth camera corresponds to a line of sight from the second display apparatus to the studio talent, the fourth video feed comprising a fourth video image of the studio talent from a second perspective, the second perspective different than the first perspective;
means for transmitting the fourth video feed to a fourth display apparatus at the stage site, the fourth display apparatus hidden from view of the audience area and operable to reproduce the fourth video image, the fourth video image viewable from the second region of the stage area.

* * * * *